United States Patent [19]

Adelman et al.

[11] 4,156,931

[45] May 29, 1979

[54] DIGITAL DATA COMMUNICATIONS DEVICE WITH STANDARD OPTION CONNECTION

[75] Inventors: Arnold E. Adelman, Hudson; Leonard F. Halio, Stow, both of Mass.; Mark J. Sebern, Cedarburg, Wis.

[73] Assignee: Digital Equipment Corporation, Maynard, Mass.

[21] Appl. No.: 909,442

[22] Filed: May 25, 1978

[51] Int. Cl.² .............................................. G06F 3/00
[52] U.S. Cl. ................................................. 364/900
[58] Field of Search ... 364/200 MS File, 900 MS File

[56] References Cited

U.S. PATENT DOCUMENTS

| 3,403,383 | 9/1968 | Kienzle et al. | 364/200 |
| 3,755,790 | 8/1973 | Berger | 364/900 |
| 4,028,538 | 6/1977 | Olander, Jr. et al. | 364/900 |

*Primary Examiner*—Harvey E. Springborn
*Attorney, Agent, or Firm*—Cesari and McKenna

[57] ABSTRACT

A communications device is used for transferring data to and from a data processing system. A controller in the communications device responds to communications signals from a signal source associated with the data processing system. A standard option connection is interposed between the controller and the signal source. When an option device is to be used, a circuit board is positioned in the connection. Conductors on the circuit board control the transfer of signals between the communications device and the signal source. The option device also includes data handling circuitry that responds to signals on the conductors or that may interrupt and/or modify these signals. The board also controls an option present signal used by the communications device for control purposes.

25 Claims, 6 Drawing Figures

DIGITAL DATA COMMUNICATIONS DEVICE WITH STANDARD OPTION CONNECTION

BACKGROUND OF THE INVENTION

This invention generally relates to digital data processing systems and more specifically to communications devices for use in such systems.

One of the more important aspects of the operation of any digital data processing system is the transfer of data to and from the processing portion of such a system. There are a wide variety of input and output units which provide this transfer of information. In the subsequent discussion, these units are called "communications devices". Teletypewriters and combined cathode ray tube, or video, and input keyboard devices represent two popular types of communications devices used to communicate with a data processing system.

In many applications it is desirable to add additional features to these communications devices. For example, a combined video terminal and keyboard device provides no typed, or "hard", copy of the information that is transferred into the system or that is displayed on the video device from the system. Many such units, however, do offer a slave printer as an option to capture some or all of this information on paper. Conversely, some teletypewriters offer a video option. Both CRT and teletypewriter devices offer, as other option devices, tape memory units and even separate central processing and related units.

These various option devices can be classified as "passive" or "active" devices. The slave printer, for example, is a passive device. Generally a passive device does not control communications between the communications device (i.e., the CRT device) and the data processing system. That is, a passive device normally only responds to data from the data processing system and passes data back to the data processing system without interferring with any other operations. Alternately, the passive device may also modify the data. In the prior art, passive devices are connected to communications devices by designing both the communications device and the option device to interact with each other. Particular leads for predefined signals are properly terminated. Conductors then are tapped off these leads through a connector for the option device.

Active devices may take over control of the communications with the data processing system. They also may process the information or may communicate directly with the communications device as a separate data processing system. Prior art active devices have generally been implemented either through the use of multiplexing, or other switching, networks or by interposing the active device directly between the communications device and the data processing system.

The particular interconnections of option devices and communications devices in the prior art are restricted. Option devices are generally designed to operate with a particular communications device manufactured by the same manufacturer. If a new option device is desirable, prior options and/or the communications device may have to be redesigned. Passive and active devices generally cannot be connected to the same locations electrically in the prior art communications devices. The foregoing restrictions effectively limit the number of option devices that can connect to a particular communications device and conversely limit the number of communications devices that can accept any particular option device.

Therefore, it is an object of this invention to provide circuitry for enabling the interconnection of communications devices and option devices.

Another object of this invention is to provide circuitry for interconnecting a communications device and a variety of option devices.

Still another object of this invention is to provide interconnection circuit that enables an option device to be utilized with a variety of communications devices.

Still another object of this invention is to provide a communications device that will accept passive and active option devices without requiring any structural circuit or program changes.

SUMMARY

In accordance with this invention, a communications device includes a controller. The controller responds to communications signals from a signal source connected to a data processing system and operates the communications device. An option connection in the communications device is interposed between the controller and the signal source. The option connection transfers signals between the signal source and the controller through normally conductive switching elements. When an option device is to operate with the communications device, the connections through the normally conductive switching elements are interrupted and circuitry associated with the option thereafter controls the transfer of signals through the switching elements.

This invention is pointed out with particularity in the appended claims. The above and further objects and advantages of this invention may be better understood by referring to the following description taken in conjunction with the accompanying drawings.

DESCRIPTION OF AN ILLUSTRATIVE EMBODIMENT

Figure 1:
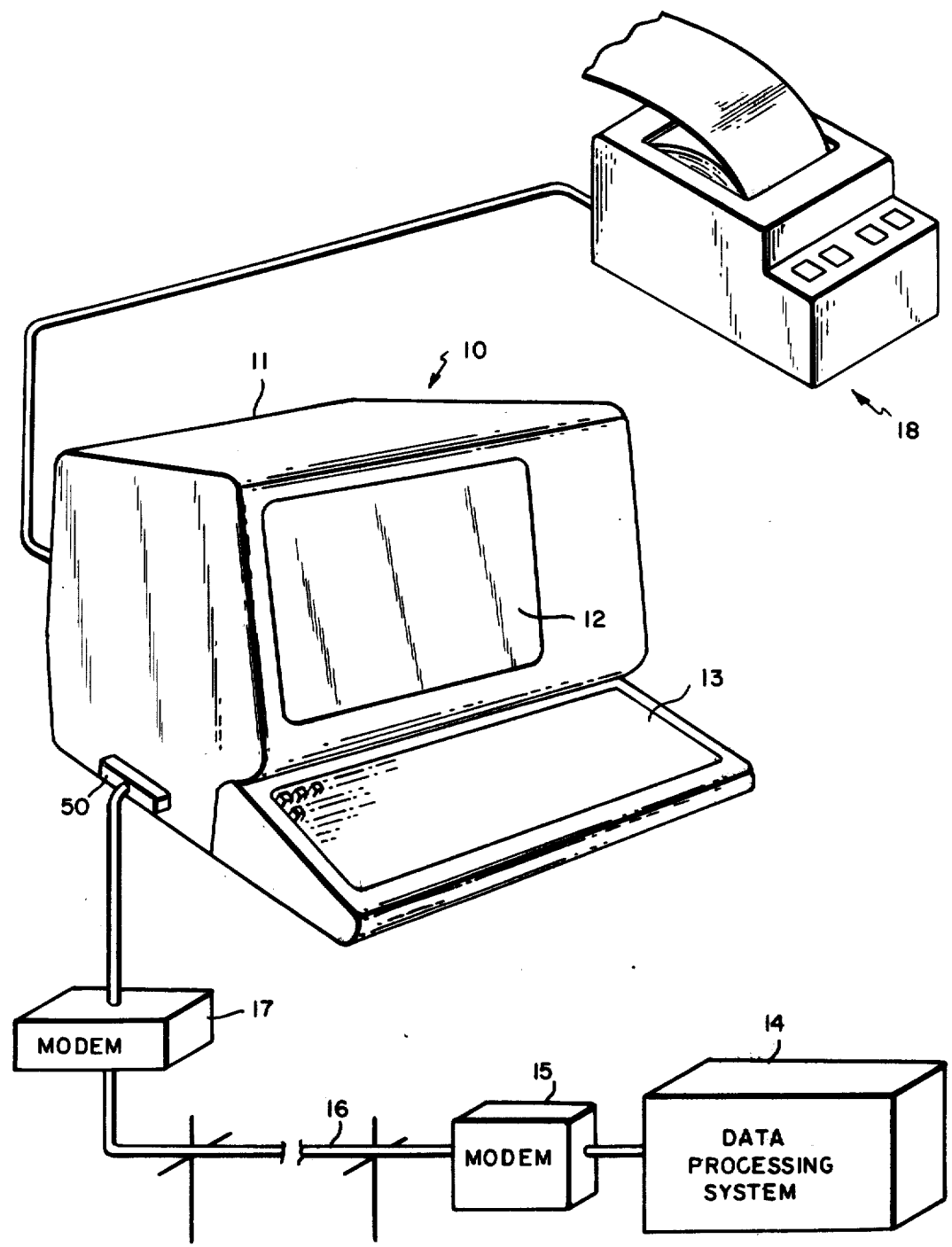
FIG. 1 is a pictorial view of a data processing system utilizing a communications device and option device in accordance with this invention.

FIG. 1 pictorially depicts a communications device 10. In this specific embodiment, the communications device 10 is an input/output unit 11 having a video, or CRT, display screen 12 for providing output information and a keyboard 13 for allowing an operator to send information to a data processing system.

Communications devices can connect to a data processing system through a wide variety of connections. When the communications device and data processing system are at the same site and in close proximity, the communications device may be connected directly to an internal bus in the data processing system. In other applications the communications device may be connected through serial line interfacing circuits to transmit information digitally between the data processing system and the communications device. In many applications, however, the communications device is located remotely with respect to the data processing system. It is necessary to convert the digital data at the data processing system and the communications device to analog form for transmission over an analog network such as the conventional telephone switching systems.

FIG. 1 depicts such a remote installation. More specifically, the communications device 10 in FIG. 1 operates with a data processing system 14 at a remote location. The data processing system 14 includes circuitry for transmitting signals to a modem (modulator-demodulator) 15. The modem 15 converts the binary signals from the data processing system 14 into analog form for transmission over the telephone switching network represented by conductors 16. A modem 17 receives these analog signals and demodulates them into communications signals having predetermined characteristics. For example, the most modems produce or respond to standard EIA signals that are described later.

When it is necessary for the communications device 10 to transfer information to the data processing system, a reverse operation occurs. That is, circuitry in the input/output unit 11 associated with the keyboard 13 generates signals that are converted into the standard communication signals. The modem 17 modulates these signals onto a carrier signal for transmission over the telephone switching network 16 to the modem 15. The modem 15, in turn, demodulates the signals and conveys signals in digital form to the data processing system 14. Thus, the circuitry shown in FIG. 1 establishes bidirectional communications.

The system shown in FIG. 1 also depicts a slave printer 18 which connects to the input/output unit 11 in accordance with this invention. Functionally, an operator can selectively turn the printer on and off thereby to capture on paper information as it is being transmitted to the video display 12. Alternatively information sent to the data processing system through the input keyboard 13 also can be captured.

Figure 2:
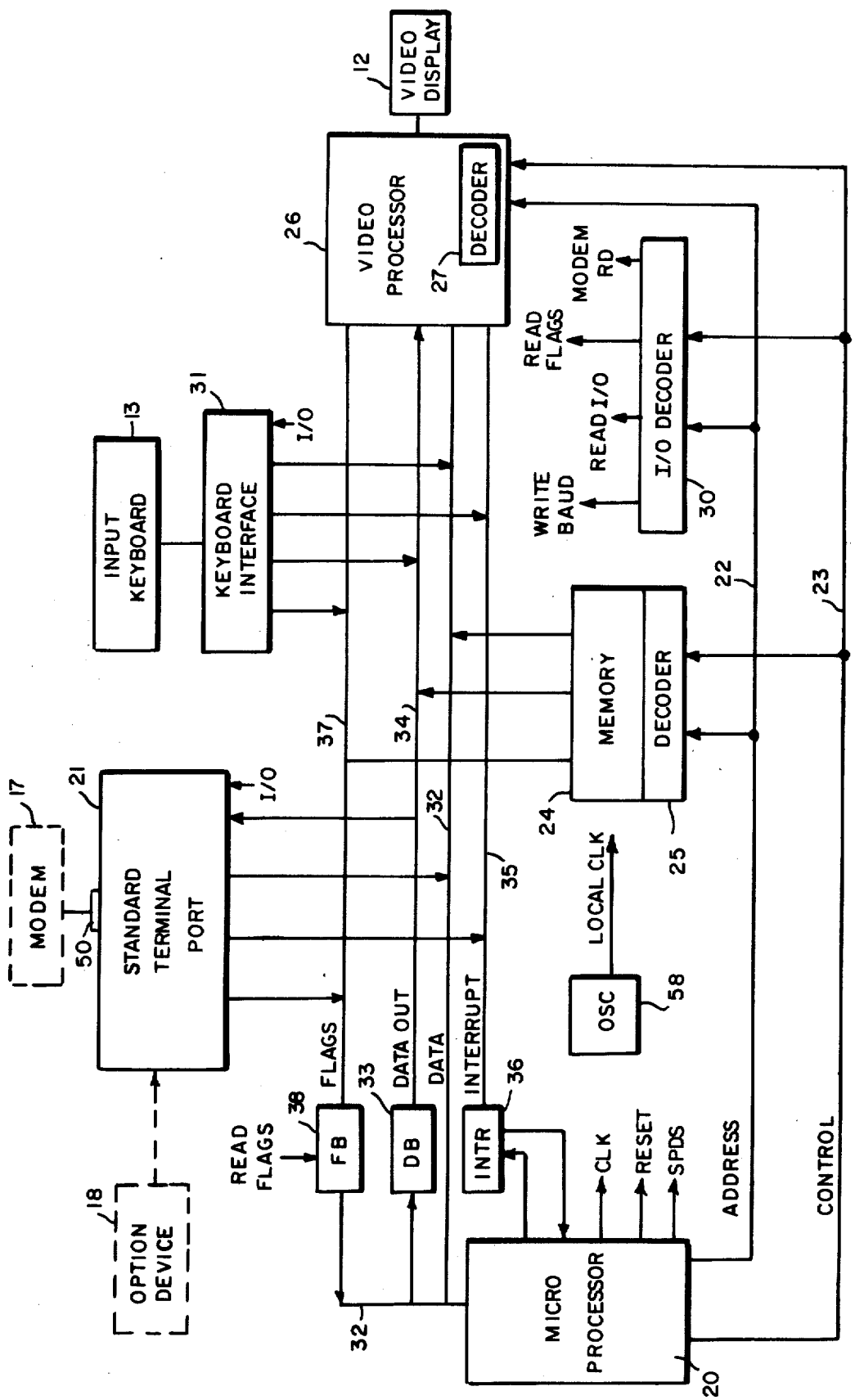
FIG. 2 is a block diagram of the communications device shown in FIG. 1.

FIG. 2 depicts the structure of the input/output unit 11 and the interconnection of the input/output unit 11 to the modem 17 and an option device 18 that are shown in phantom. A microprocessor 20 controls the operation of the input/output unit 11. Although any one of several commercial microprocessors might be used, the circuitry in FIG. 2 is designed to operate with an Intel Corporation 8080A microprocessor. The microprocessor 20 controls the transfer of signals to and from the modem 17 through a standard terminal port 21 constructed in accordance with our invention and shown in more detail in FIG. 3.

Still referring to FIG. 2, the microprocessor 20 transmits address and control signals on conductors 22 and 23 respectively. Various decoders respond to these signals to select a particular register unit for a subsequent transfer of information. For example, an addressable location in memory 24 is selected when a decoder 25 detects any of the addresses assigned to the memory 24. Registers in a video processor 26 are selected whenever a decoder 27 detects corresponding address signals. An I/O decoder 30 also responds to particular addresses and control signals. In addition, each of the decoders 25, 27 and 30 will respond to particular ones of the control signals to produce signals that cause data to be transferred to the register (a writing operation) or to be retrieved from the register ( a reading operation). Thus, for example, the I/O decoder 30 transmits a WRITE BAUD signal to indicate that a divisor is to be transferred into a baud rate generator shown in FIG. 3.

The microprocessor 20 also includes a DATA bus 32. During a reading operation, the microprocessor 20 retrieves data that is on the bus 32. During a writing operation, the information is transferred through a data buffer (DB) 33 and onto a DATA OUT bus 34. Thus, during a reading operation, the microprocessor 20 can retrieve information from the standard terminal port 21, the video processor 26 that controls video display 12, the memory 24 or a keyboard interface 31 that responds to the operation of the input keyboard 13. Likewise, during a writing operation, the microprocessor 20 can transfer information to any of the foregoing memories or interfaces.

The microprocessor 20 also operates in response to FLAG signals and INTERRUPT signals. Each of the standard terminal port 21, video processor 26 and keyboard interface 31 has the capability of generating an INTERRUPT signal which is placed on an INTERRUPT bus 35 and coupled to an interrupt (INTR) circuit 36. These circuits also have the capability of generating flag signals which are transmitted onto a FLAG bus 37 and then through a flag buffer (FB) circuit 38 onto the bus 32 to be read into the microprocessor 20. Such a reading operation would occur, for example, when the address and control signals on the buses 22 and 23 cause the I/O decoder 30 to generate a READ FLAG signal.

The microprocessor 20 also transmits CLK signals as a clocking signals and a RESET signal as a resetting signal.

Figure 3:
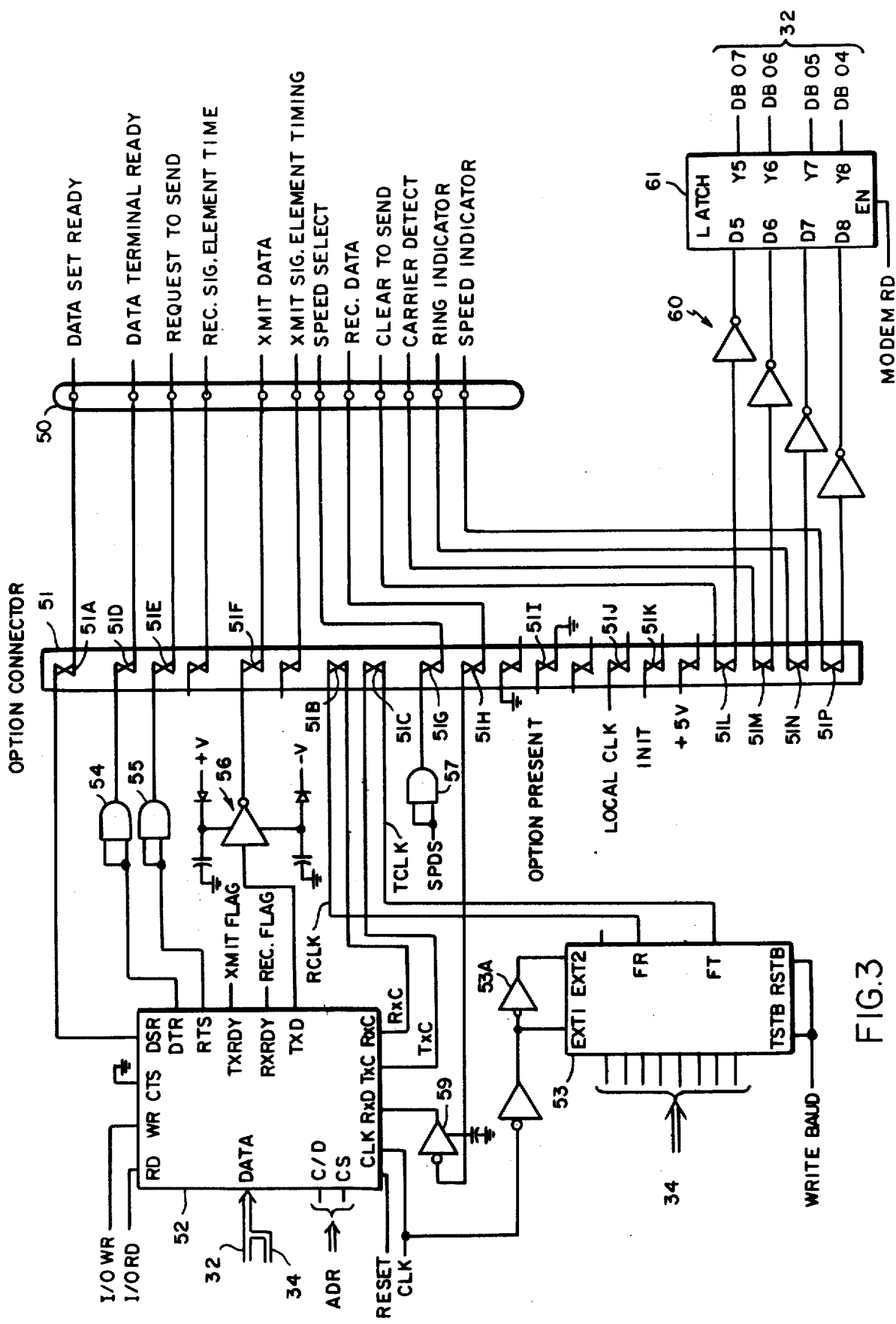
FIG. 3 is a logic diagram of a standard terminal port shown in FIG. 2.

The standard terminal port 21 in FIG. 2 enables the objects of this invention to be attained and is shown in detail in FIG. 3. An EIA connector 50, also shown in FIG. 1, provides a connector to which the modem 17 attaches. The signals present at the EIA connector 50 are communications signals that have predetermined characteristics and meanings. In this particular communications device, a data terminal ready (DTR) signal indicates whether the data terminal has power, is in a local mode or has generated a break code. A request to send (RTS) signal is asserted whenever power is applied to the terminal. An XMIT DATA signal carries data signals in serial form from the communications device 10 to the data processing system 14. An REC DATA conductor, on the other hand, receives data from the data processing system 14 for transfer to the input/output unit 11. A SPEED SELECT signal can be used as a secondary request to send signal while a SPEED INDICATOR signal can be used as a secondary carrier selection signal.

These signals and the other standard communication signals that are shown in FIG. 3 are carried from the connector 50 to an option connector 51. The option connector 51 comprises discrete, normally conductive switching elements. As shown in FIG. 3, for example, a switch 51A normally couples the data set ready conductor to a DSR input of a circuit generally known as a universal asynchronous receiver transmitter (UART) 52.

In this specific embodiment, a programmable communication interface such as an 8251 interface manufactured by Intel Corporation can be used as this UART. In such a programmable UART, a particular operation is selected in response to I/O WR, I/O RD, A00 and A01 signals at WR, RD, C/D and CS inputs, respectively. The UART 52 also includes a data bus buffer which receives data signals from bus 32 and transmits signals onto bus 32 in parallel at a parallel data connection. It also can transmit and receive data in serial form at a serial data connection. This connection includes a T×D terminal for transmitted data and an R×D terminal for received data. The UART 52 converts the data at the parallel and serial connection means between parallel and serial form.

Communication control signals, such as the DTR and RTS signals that appear at a control connection comprising DTR and RTS terminals, can also be coupled onto the data buffer. Timing within the interface 52 is controlled in response to the CLK pulses from the microprocessor 20 in FIG. 2 that appear at a timing connection comprising the T×C and R×C terminals. The RESET signal from the microprocessor 20 also clears the interface 52. As the operation of such devices is well known in the art, no further discussion of the details of this UART is necessary.

Timing within the communications interface 52 may vary depending upon the rate at which data is transferred. Variable data rates for receiving and transmitting can be provided independently in the circuitry of FIG. 3. The CLK pulses drive a programmable divider 53, an inverter 53A providing the necessary clock phasing. The value of the divisor is entered into the programmable divider 53 whenever the WRITE BAUD signal is generated by the I/O decoder 30 in FIG. 2. More specifically, the least significant four bit positions on the bus 34 carry a receive clock rate divisor while the four most significant bits carry the transmit clock rate divisor. In this particular embodiment any divisor up to 16 can be selected.

Pulses from the programmable divider 53 at the FR output (i.e., an RCLK pulse) are coupled to a switch 51B in the option connector 51 and then back to an R×C input of the communications interface 52 thereby to produce R×C internal timing pulses. Likewise, pulses at an FT output (i.e., TCLK pulses) of the programmable divider 53 pass through the normally closed switch contacts 51C back to the T×C input of the UART 52 as T×C internal timing pulses. The use of the programmable divider 53 greatly facilitates the flexibility of the communications device and associated option devices because they can accomodate different baud rates on the XMIT DATA and REC DATA conductors. Markedly different baud rates are found, for example, in combined video and keyboard devices because the input keyboards produce data signals at very slow data rates whereas video input can receive data signals at high data rates.

With respect to other EIA signals, buffers 54 and 55 couple the DTR and RTS signals from the UART 52 through switch contacts 51D and 51E respectively for transfer to the connector 50. A buffer circuit 56 couples data in serial form from the UART 52 to switch contacts 51F and the XMIT DATA connection on the connector 50. The REC DATA signals from the connector 50 are coupled through switch contacts 51H and buffer circuit 50 to the R×D input of the UART 52.

An SPDS signal passes through a buffer 57 and switch contacts 51G to a speed select signal conductor at the EIA connector 50. Normally the SPDS signal is asserted. Switch contacts 51I control the transmission of an OPTION PRESENT signal which is transmitted onto the FLAGS bus 37 for monitoring by the microprocessor 20. During normal operation the contacts 51I are closed and one of the contacts 51I is grounded. The OPTION PRESENT is thus at a non-asserted, or ground, level when no option device is connected to the communications device.

A LOCAL CLK timing signal is obtained from an oscillator 58 (FIG. 2) at contacts 51J. The LOCAL CLK signal indicates the data transfer rate that characterizes the communications device.

An initializing signal (INIT) is applied to contacts 51K.

The EIA leads also carry some other signals including a clear to send signal, a carrier detect signal, a ring indicator and a speed indicator signal. These signals are carried to switch contacts 51L, 51M, 51N and 51P respectively. Buffers 60 then convey the signals individually into a gated latch 61. Whenever the I/O decoder circuit 30 in FIG. 2 produces the MODEM RD signal, the latch 61 couples the corresponding signals onto predetermined ones of the conductors on the bus 32 so that the microprocessor 20 and related control programs can ascertain the status of these incoming EIA leads.

The option connector 51 is physically contructed to accept the edge connector of a printed circuit board. The construction of an edge connector with sets of contact fingers is well known. It is sufficient to state that each set comprises one contact finger on each side of a circuit board. As the circuit board is inserted, the edge connector separates the individual switch contacts 51A through 51P. Now each switch contact engages one of the contact fingers and the circuitry on the inserted option board controls the transfer across the option connector 51 of signals between the EIA connector 50, which represents a source of communications signals having predetermined characteristics, and other elements that form the controller in FIG. 3.

Figure 4:
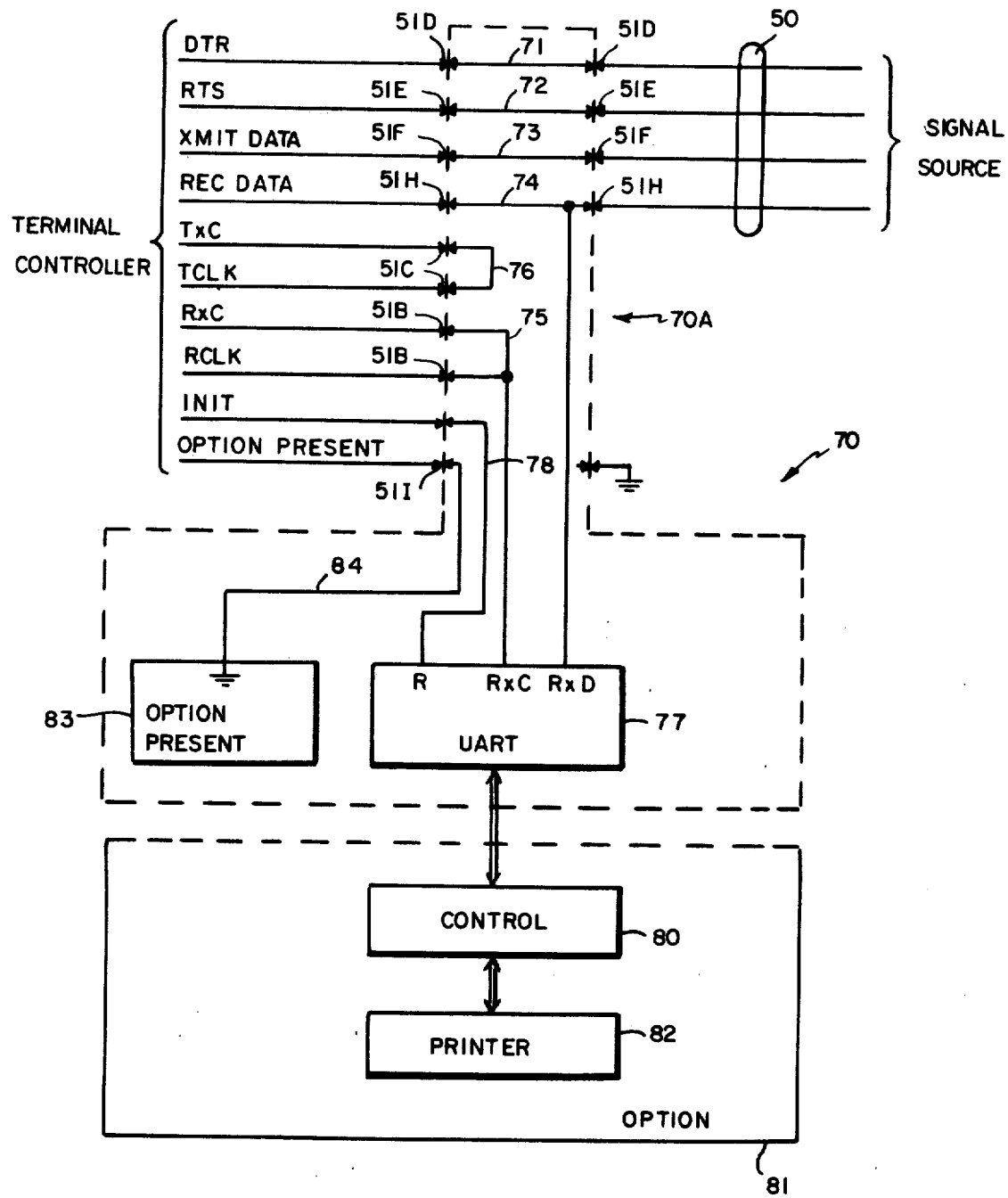
FIG. 4 is a block diagram of a passive option device.

As previously indicated, there are three basic categories of option devices that can operate with the communications device 10 shown in FIG. 1. FIG. 4 depicts a "read-only passive" option device. That is, it is an option device which merely responds to signals on the receive data line from the signal source. An option board 70 is represented diagramatically as including an edge connector portion 70A that inserts into the option connector 51. It contains conductor runs 71, 72, 73 and 74 which respectively interconnect the contact fingers that engage switch elements 51D, 51E, 51F and 51H respectively. Thus, the DTR, RTS, XMIT DATA and REC DATA signals continue to be coupled directly between the signal source represented by the EIA connector 50 and the communications interface 52 in FIG. 3 that connects to the communications device controller. In addition the option board 70 continues to maintain connections through conductors 75 and 76 between switch contacts 51B and 51C so the clocking signals from the FR terminal of the programmable divider 53 in FIG. 3 are coupled back to the UART 52 as R×C pulses.

The option connector 70 also contains data handling circuitry in the form of another UART 77. The RCLK clock pulses are applied to the R×C input and the R×D input connects to the REC DATA by interconnecting conductors 75 and 74 on the option board. A conductor 78 conveys the INIT signal to a reset input of the UART 76. The UART 76 couples appropriate signals to a control 80 in the option device 81. In this particular embodiment, the option device 81 is a slave printer, such as the printer 18 in FIG. 1, so the control 80 drives a printer element 82. Thus, as data is transferred from the signal source to the communications device (i.e., the terminal controller), it is additionally transferred through the option card 70 and printed. Moreover, all timing is synchronized to the operation of the communications device by utilizing the received clocking (RCLK) pulses from the programmable divider 53 in FIG. 3.

The option board 70 also contains an option present circuit 83. In a read-only passive device the option present circuit 83 generates a non-asserted signal. In this embodiment, a ground level signal is a non-asserted signal. Thus, the circuit 83 comprises a grounded conductor 84 that engages the contacts 51I in the option connector 51, so the OPTION PRESENT signal is not asserted. As a result, the communications device continues to operate as if the option device were not present.

Figure 5:
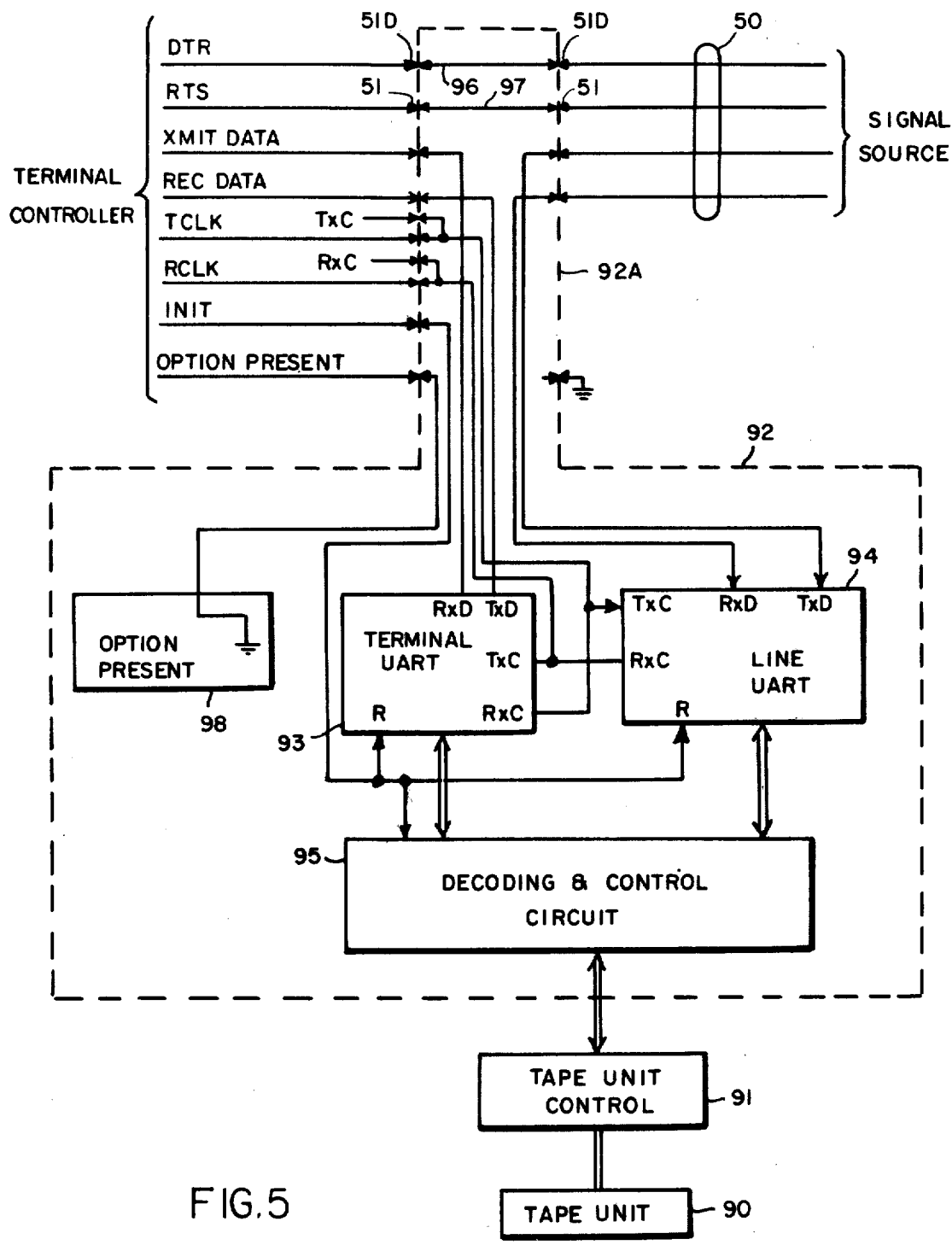
FIG. 5 is a block diagram of another passive option device.

FIG. 5 discloses another passive device. In this particular embodiment, the option comprises a tape unit 90 and its corresponding control circuit 91. It connects to a circuit board means 92 that includes a edge connector portion 92A. Two UARTS, designated as a terminal UART 93 and a line UART 94, connect to a decoding and control circuit 95 thereby to constitute a data handling means. The decoding and control circuit 95 connects to the tape unit control 91.

Various conductors on the option card 92 interconnect the individual switching contacts of the option connector 51. More specifically conductors 96 and 97 interconnect the switches 51D and 51E respectively thereby to convey the DTR and RTS signals directly between the terminal controller and the signal source 50. All the other signals, however, pass through the data handling circuitry on the option card 92. More specifically, the XMIT DATA conductor and REC DATA conductor from the terminal controller connect to the R×D and T×D terminals of the terminal UART unit 93. The XMIT DATA and REC DATA conductors from the signal source connect, respectively, to the T×D and R×D connections of the line UART 94. The TCLK and RCLK signals are coupled back into the terminal controller as the T×C and R×C signals respectively. In addition, the TCLK signal is connected to the R×C and T×C inputs of the UARTS 93 and 94 repectively while the RCLK signal is connected to the T×C and R×C connections on the UARTS 93 and 94 respectively. Thus, the RCLK clocking pulses control the transmitting rate of the terminal UART 93 and the receiving rate of the line UART 94. The INIT signal is connected to reset inputs in each of the units 93 and 94. In this particular application, the OPTION PRESENT signal from circuit 98 is not asserted.

In this particular configuration, all data passing between the terminal controller and the signal source must pass through the UARTS 93 and 94. This data then can be shifted into the decoding and control circuit 95 for analysis and the circuitry can respond to preselected codes, such as those standard codes that turn a unit on and off. As the tape unit in this configuration may have the capability for sending and receiving data, the data processing system may control the option device and the communications device to the mutual exclusion of each other. For example, if the tape unit 90 is transmitting data to the signal source through the connector 50, the operator must be precluded from sending any data by actuating the keyboard and vice versa. To do this, the data processing system can send other preselected standard codes to either the option device or the communications device thereby to turn off the particular unit.

Figure 6:
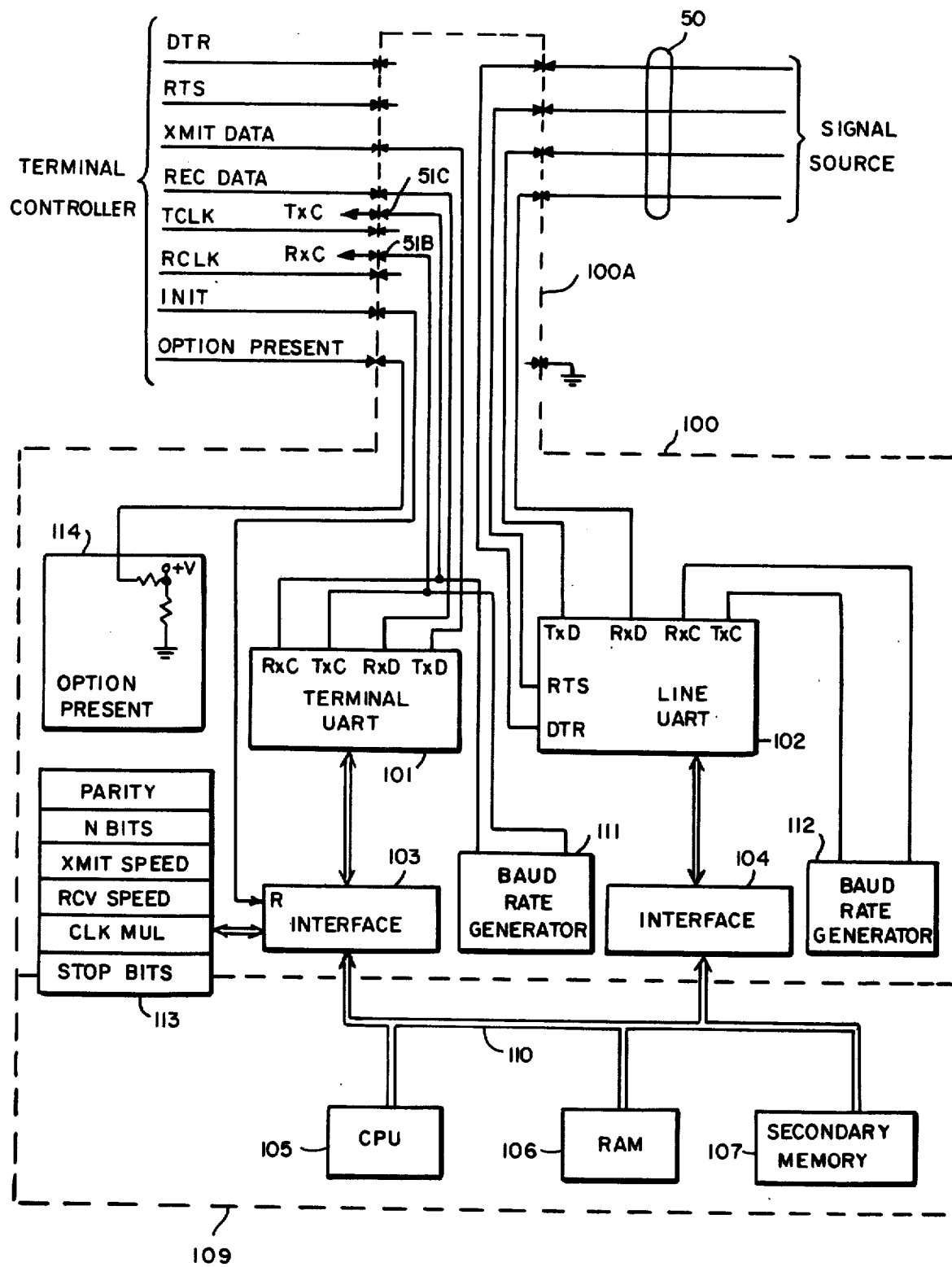
FIG. 6 is a block diagram of an active option device.

FIG. 6 dicloses an active option device which controls communications with the signal connector 50. This device also requires that all data pass through the option device and additionally includes the capability of communicating with the terminal controller directly. In this specific embodiment of the active device shown in FIG. 6, data handling circuitry mounted on an option printed circuit board 100 includes a terminal UART 101 and a line UART 102. The terminal and line UARTS 101 and 102 connect respectively to interface units 103 and 104. In this specific embodiment, the option device also includes a data processing system comprising a central processor unit (CPU) 105, a random access memory (RAM) unit 106 and a secondary memory unit 107. All these units and the interfaces 103 and 104 are interconnected by a bus 110. In one specific embodiment the option device might comprise a PDP11 data processing system.

There are several features of the option card 100 that distinguish this particular embodiment from the prior embodiments of FIGS. 4 and 5. First, an edge connector portion 100A of the option card 100 breaks the DTR and RTS signals. The RTS and DTR signals are transmitted and received, respectively, by the line UART 102. As in the previous example, the XMIT DATA and RCV DATA signals are coupled to corresponding terminals or connections in both the terminal UART 101 and the line UART 102 so all data passes through the option device. In this particular embodiment, there are also disclosed two (2) baud rate generators 111 and 112. These two generators transmit independent timing signals for the terminal UART 101 and the line UART 102 respectively. In addition, the baud rate generator 111 has conductors connected back to corresponding switching contacts 51C and 51B to transmit the T×C and R×C internal clocking pulses for the communications device. Thus, the baud rates are set by the option device in this particular application. It will be apparent, however, that the timing signals could be derived from the terminal controller, as previously described.

Interface 103 also connects to a number of registers 113. These registers contain certain information concerning the status of the option device. In this particular embodiment separate registers are shown for purposes of explanation. When the option device includes a data processing system as shown in FIG. 6, the registers would be located at specified locations in the random access memory 106. Each register contains one multiple bit character. A PARITY character identifies the particular parity. An N BITS character indicates the number of binary digits in each data character. The XMT SPEED and RCV SPEED characters respectively indicate the data transfer rate for transmitted and received data thereby to enable the circuity in FIG. 6 to support separate data rates.

A CLK MUL character identifies the baud rate factor that is entered into the UART 52 in FIG. 3.

In this particular embodiment the OPTION PRESENT signal is asserted by an option present generator 114. Certain conditions must be established between the communications device and the option device when the OPTION PRESENT signal is asserted. For example, the N BITS character is set to specify that each character contains eight bits. A STOP BITS character is set to one stop bit and the PARITY character is set to no parity. In addition, conditions for line synchronization must be supported at both locations, and the baud factor must be set to the same value. In addition, the communications device also must be capable of performing certain control functions with respect to the option device.

More specifically, in this embodiment the microprocessor 20 in FIG. 2 will include the capability of transmitting a control sequence either upon receipt of a request from the data processing system or upon the alteration of internal conditions by an operator if the OPTION PRESENT signal is asserted. The second condition is important to this invention because under this condition the microprocessor 20 transfers information into the registers 113 in FIG. 6. During this sequence the microprocessor 20 transfers data characters into the option device 100 over the XMIT DATA line. In some embodiments these characters also may be transferred to the signal source 50. The transferred characters include message character that identifies nature of the message, a character which identifies source of the message (i.e., whether the data processing system requested the information or whether the message is being transferred to the option device). Then the PARITY, N-BITS, XMT SPEED, RCV SPEED, CLK MUL and STOP BITS characters are sent to the option device 100. The terminal UART 101 and the interface 103 then interact to transmit this information into the character storage areas 113.

From the foregoing discussion of the specific embodiment shown in FIG. 6, the circuitry on option card 100 and the data processing system 109 interact with the terminal controller and the signal connector 50 to add functionality to the terminal. For example, the data processing system 110 could be programmed to prompt the user at the terminal and then intercept the incoming data from the terminal, convert it into a specific form for the remote data processing system and convey only that information in that form to the signal connector 50. In another example, the data processing system 109 could be part of a graphics apparatus. The data processing system 109 could receive graphics instructions from the signal source, convert them into a bit map representation and transmit that bit map serially to the printer terminal controller.

Therefore, in accordance with this invention, we have provided a circuit which allows greater flexibility in interconnecting different types of devices in a digital data computer system. A communications device constructed in accordance with this invention is adpated to receive a variety of optional devices which can range from read-only passive devices that merely respond to other signals that are being transferred to the terminal controller to active devices which intercept and modify all signals otherwise transferred between the communications device in the data processing system. It will also be apparent that we have disclosed a communications device and specific circuitry for modifying that device to achieve these capabilities in terms of a specific embodiment that is related to the use of specific standard EIA signals. It will be apparent, however, that these signals and the circuitry for achieving this capability can be modified without departing from the invention. Moreover, three specific options have been shown for use with a specific communications. These also can be modified along the lines set forth in the specification. Therefore, it is the object of the appended claims to cover all such variations and modifications has come within the true spirit and scope of this invention.

What we claim as new and desire to secure by Letters Patent of the United States is:

1. A communications device for communicating with a data processing system, said device being connected to the data processing system by a signal transfer means for transferring therewith communications signals having predetermined characteristics and being adapted to operate with a second communications device that includes circuit board means with circuit means for controlling said second communications device in response to certain of the communications signals, said communications device comprising:
A. controller means for controlling the operation of said communications device in response to certain of the communications signals, and
B. option connection means for transferring certain of said signals between said controller means and the signal transfer means, said option connection means including:
  i. signal transfer connection means for connection to the signal transfer means, and
  ii. normally conductive, circuit board actuated switching means connected to said controller means and to said signal transfer connection means, the insertion of said a circuit board means into said switching means interposing the circuit means in the second communications device between said controller means and the signal transfer means and the removal of a circuit board means providing the normally conducting connection between said controller means and the signal transfer means.

2. A communications device as recited in claim 1 wherein said option connection means additionally includes means for generating an option present control signal of a first valve when said circuit board means is interposed, and wherein said controller means includes means for monitoring the value of the option present signal, said switching means having means to interconnect said generating and monitoring means during said interposing.

3. A communications device as recited in claim 2 wherein said controller means includes parallel data processing means and said option connection means includes:
  i. timing means for generating timing signals, and
  ii. communications interfacing means having a parallel data connection means connected to said parallel data processing means, serial data connection means, and timing connection means, said communications interfacing means converting data signals at said parallel and serial data connection means between parallel and serial form in response to timing signals from said timing means, said switching means including means for interconnecting said serial data connection means to the signal transfer means and means for interconnecting said timing means and said timing connection means.

4. A communications device as recited in claim 3 wherein said timing means includes means for generating variable clocking rates thereby to vary the transmission rate of data at said serial data connection means.

5. A communications device as recited in claim 4 wherein said serial data connection means includes separate terminal means for received and transmitted data and said variable clocking means includes first and second generating means to generate first and second independent clocking signals and said timing connection means including separate terminals for first and second clocking signals, said controller means including means for independently setting said first and second variable clocking means thereby to independently set the data transmission rates at said separate terminal means at said serial data connection means.

6. A communications device as recited in claim 3 wherein said communications interfacing means includes communications control connection means for said switching means for connecting said communications control connection means to the signal transfer means.

7. An optional communications device for use with a primary communications device that connects to a signal transfer means connected to a data processing system, the primary communications device including controller means for controlling the operation of the primary communications device in response to certain of communications signals received from the signal transfer means and normally conductive, connector actuated switching means connecting the controller means and the signal transfer means, said optional communications device comprising:
  A. circuit board means,
  B. data handling means on said circuit board means for responding to certain of the signals from the signal transfer means,
  C. board connector means on said circuit board means for insertion into the switching means thereby to interrupt the transfer of said communications signals through the switching means, and
  D. conductive means on said circuit board means interconnecting said board connector means and said data handling means for controlling the transfer of communications certain of said signals between the signal transfer means and both said data handling means and the controller means in the primary communications device.

8. An optional communications device as recited in claim 7 wherein said optional communications device includes means for generating an option present signal that is monitored by the controller means and said conductive means includes first conductor means for connecting said generating means to first connector means of said board connector means whereby the switching means couples the option present signal to the controller means.

9. An optional communications device as recited in claim 8 wherein the signals appearing at the signal transfer means include data signals and communication control signals and said data handling means includes data connection means, said conductive means additionally including second conductor means for connection to data connector means at said board connector means for the data signals and third conductor means for connection to a control connector means at said board connector means for the communications control signals.

10. An optional communications device as recited in claim 9 wherein the data signals include received data signals and transmitted data signals and the controller means includes means for generating received data timing signals, said option present signal generating means generating a non-asserted signal, said board connector means including received data and received timing connector means, said data handling means including data means responsive to the received data signals and the received data timing signals and said conductive means including fourth conductor means for connecting said data means to said received timing connector means, said second conductor means connecting said received data connector means to said data means and said third conductor means connecting said control connector means directly thereby to couple the communications control signals directly between the controller means and the signal transfer means.

11. An optional communications device as recited in claim 9 wherein the data signals include received data signals and transmitted data signals, said option present signal generating means generating a non-asserted signal, said board connector means including received data and transmitted data connector means, said data handling means including timing circuit means and data means responsive to said timing circuit means and the received and transmitted data signals, said second conductor means connecting said received and transmitted data connector means to said data means and said third conductor means connecting said control connector means directly thereby to couple the communications control signals directly between the controller means and the signal transfer means.

12. An optional communications device as recited in claim 11 wherein the controller generates received and transmitted data timing signals, said board connector means including timing signal connector means and said conductive means includes fourth conductor means connecting said timing circuit means to said timing signal connector means.

13. An optional communications device as recited in claim 9 wherein the data signals include received data signals and transmitted data signals, said option present signal generating means generating an asserted signal, said board connector means including received data and transmitted data connector means and communication control connector means, said data handling means including timing circuit means, data means responsive to said timing circuit means and the received and transmitted data signals and communication control means for controlling communications, said second conductor means connecting said received and transmitted data connector means to said data means and said third conductor means connecting said control connector means to said communication control means, said communications control means thereby controlling communications with the signal transfer means.

14. An optional communications device as recited in claim 13 wherein the controller generates received and transmitted data timing signals, said board connector means including timing signal connector means and said conductive means includes fourth conductor means connecting said timing circuit means to said timing signal connector means.

15. An optional communications device as recited in claim 13 wherein said timing circuit means generates received and transmitted data timing signals, said board connector means including timing signal connector means and said conductive means includes fourth conductor means connecting said timing circuit means to said timing signal connector means whereby said timing circuit means transfers timing signals to the controller means.

16. A communications device for communicating with a data processing system by being connected to a signal transfer means for transferring therewith communications signals that have predetermined characteristics, said communications device comprising:

A. controller means for controlling the operation of said communications device in response to certain of the communications signals, B. option connection means for transferring said signals between said controller means and the signal transfer means, said option connection means including:
  i. signal transfer connection means for connection to the signal transfer means, and
  ii. normally conductive, circuit board actuated switching means connected to said controller means and to said signal transfer connection means for normally providing a direct connection between said controller means and the signal transfer means, C. optional communications means for operation with said communications device including:
  i. circuit board means,
  ii. data handling means on said circuit board means for responding to certain of the signals from the signal transfer means, and
  iii. board connector means on said circuit board means for insertion into said switching means thereby to interrupt the transfer of said signals through said switching means, and
  iv. conductive means on said circuit board means interconnecting said board connector means and said data handling means for controlling the transfer of the signals between the signal transfer means and both said data handling means and said controller means.

17. A communications device as recited in claim 16 wherein said optional communications device includes first means for generating an option present signal, said option connection means additionally including second means for generating an option present control signal, said controller means including means for monitoring the option present signal, said switching means interconnecting said second generating and monitoring means and said conductive means including first conductor means for connecting said first generating means to first connector means of said board connector means whereby the switching means controls whether the option present signal from said first generating means or the option present control signal from the second generating means is coupled to said controller means.

18. A communications device as recited in claim 17 wherein signals appearing at the signal transfer means include data signals and communication control signals and wherein said controller means includes parallel data processing means and said option connection means includes:
  i. timing means for generating timing signals, and
  ii. communications interfacing means having a parallel data connection means connected to said parallel data processing means, serial data connection means, and timing connection means, said communications interfacing means converting data signals at said parallel and serial data connection means between parallel and serial form in response to timing signals from said timing means, said switching means including means for interconnecting said serial data connection means to the signal transfer means and means for interconnecting said timing means and said timing connection means, and
said data handling means includes data connection means, said conductive means additionally including second conductor means for connection to data connector means at said board connector means for the data signals and third conductor means for connection to control connector means at said board connector means for the communications control signals.

19. A communications device as recited in claim 18 wherein said optional communications means additionally includes timing means connected to said data handling means for controlling the timing of said data handling means.

20. A communications device as recited in claim 19 wherein said timing means in said optional connection means includes means for generating variable clocking rates thereby to vary the transmission rate of data at said serial data connection means and said conductive means in said optional communications means includes fourth conductor means for connecting said timing means for said data handling means to timing connector means at said board connector means for timing signals whereby signals from said timing means in said optional connection means control the timing of said data handling means in said optional communications means.

21. A communications device as recited in claim 20 wherein said serial data connection means of said communications interfacing means includes separate terminal means for received and transmitted data and said variable clocking means in said option connection timing means includes first and second generating means to generate first and second independent clocking signals, said timing connection means including separate terminals for first and second clocking signals and said controller means including means for independently setting said first and second variable clocking means thereby to independently set the data transmission rates at said separate terminal means at said serial data connection means.

22. A communications device as recited in claim 19 wherein said timing means in said optional communications means generates timing signals that control the operation of said data handling means and said conductive means includes fourth conductor means for connection to timing signal connector means at said board connector means for the timing signals thereby to transfer the timing signals to said timing means in said controller means.

23. A communications device as recited in claim 19 wherein the data signals include received data signals and transmitted data signals and said timing means in said controller means includes means for generating received timing signals, said option present generating means generating a non-asserted signal, said board connector means including received data and received timing connector means, said data handling means including data means responsive to the received data signals and received timing signals and said conductive means including fourth conductor means for connecting said data means to said received timing connector means, said second conductor means connecting said received data connector means to said data means and said third conductor means connecting said control connector means directly thereby to couple the communications control signals directly between said controller means and the signal transfer means.

24. A communications device as recited in claim 19 wherein the data signals include received data signals and transmitted data signals, said option present signal generating means in said optional communications means generating a non-asserted signal, said board connector means includes received data and transmitted data connector means, said data handling means including timing circuit means and data means responsive to said timing circuit means and the received and transmitted data signals, said second conductor means connecting said received and transmitted data connector means to said data means and said third conductor menas connecting said control conductor means directly thereby to couple the communications control signals directly between the controller means and the signal transfer means.

25. A communications device as recited in claim 19 wherein the data signals include received data signals and transmitted data signals, said option present signal generating means in said optional communications means generating an asserted signal, said board connector means including received data and transmitted data connector means and communication control connector means, said data handling means including timing circuit means, data means responsive to said timing circuit means and the received and transmitted data signals and communication control means for controlling communications, said second conductor means connecting said received and transmitted data connector means to said data means and said third conductor means connecting said control connector means to said communication control means, said communications control means thereby controlling communications with the signal transfer means.

* * * * *

UNITED STATES PATENT AND TRADEMARK OFFICE
Certificate

Patent No. 4,156,931                          Patented May 29, 1979

Arnold E. Adelman, Leonard F. Halio and Mark J. Sebern

Application having been made by Arnold E. Adelman, Leonard F. Halio and Mark J. Sebern, the inventors named in the patent above identified, and Digital Equipment Corporation, Maynard, Massachusetts, the assignee, for the issuance of a certificate under the provisions of Title 35, Section 256, of the United States Code adding the name of David B. Hughes as a joint inventor, and a showing and proof of facts satisfying the requirements of the said section having been submitted, it is this 1st day of July 1980, certified that the name of the said David B. Hughes is hereby added to the said patent as a joint inventor with the said Arnold E. Adelman, Leonard F. Halio and Mark J. Sebern.

FRED W. SHERLING,
*Associate Solicitor.*